D. W. Crocker,
Railroad Chair,
N° 22,708. Patented Jan. 25, 1859.
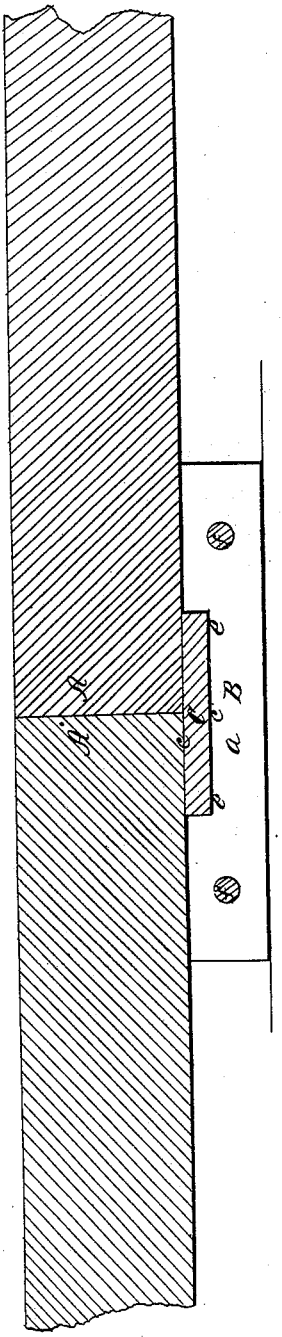
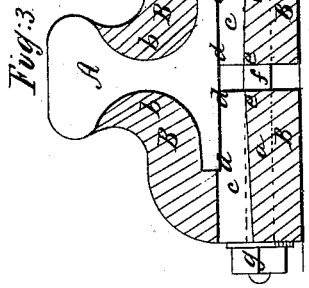
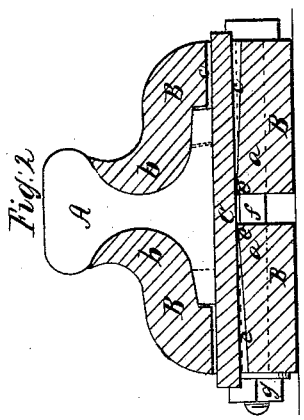

UNITED STATES PATENT OFFICE.

D. W. CROCKER, OF DEPOSIT, NEW YORK.

RAILROAD-CHAIR.

Specification forming part of Letters Patent No. 22,708, dated January 25, 1859; Reissued March 6, 1860, No. 922.

*To all whom it may concern:*

Be it known that I, D. W. CROCKER, of Deposit, in the county of Delaware and State of New York, have invented a new and useful Improvement in Railway-Chairs; and I do hereby declare that the following is a full, clear, and exact description of the same, reference being had to the accompanying drawings, forming part of this specification, in which—

Figure 1, is a longitudinal central section of a railway joint and chair, illustrating the improvement. Fig. 2, is a transverse section of the same, complete. Fig. 3, is a similar section, with the tightening key omitted.

Similar letters of reference indicate corresponding parts in the several figures.

To enable others skilled in the art to apply my invention, I will proceed to describe its construction and operation.

The invention is more particularly applicable in connection with rails of what is known as the T form, but may be applied in connection with rails of other form. The drawing represents its application in connection with the T form of rail.

A, A, are the ends of two rails which may be fitted together squarely, or in any other manner, to form the joint.

B, B, are the two portions of the chair, both alike, each constituting a half of the base $a$, $a$, and one of the jaws $b$, $b$, the jaws being made of a form to fit the bases, necks and the lower parts of the heads of the rails, whose joint comes in the middle of the chair.

$c$, $c$, are broad slots made transversely through the two pieces B, B, at an equal distance from both ends of the chair, with their top faces flush with, or very slightly higher, and parallel with the top face $d$, $d$, of the base $a$, $a$, and with their lower faces inclining upward from the outer toward the inner edges, as shown in Figs. 2, and 3, so as to leave the inner edges $e$, $e$, higher than any other portion.

$f$, $f$, are screw bolts passing through the base $a$, $a$, below and on either side of the slot, and furnished with nuts $g$, to draw the two pieces B, B, toward each other and make them clamp the rail.

C, is the tightening key which passes through the slots $c$, $c$. This key is made slightly tapering and one of the slots is made slightly wider than the other to correspond with the taper of the key, which passes directly under and in contact with the bottom of the bases of the rails. By driving this key, which rests on the inner edges $e$, $e$, of the slots, the said edges are depressed, and a lateral leverage is thereby produced on the two pieces B, B, by which the jaws $b$, $b$, are caused to clamp the rails more tightly and lock them so as to form, practically, a perfectly rigid joint, and as the rails rest on the top of the key, the weight of the engines or cars passing over them is transmitted through it (the key) to the edges $e$, $e$, and by producing a lateral leverage on the pieces B, B, draws the jaws closer against the rails, and the greater the weight the more firmly the jaws are caused to clamp the rails and the more rigid is the joint.

I do not claim the longitudinal division of the chair nor the use of a key passing through the chair; but

What I claim as my invention and desire to secure by Letters Patent, is—

The arrangement and combination, substantially as herein shown and described, of the inclined grooves ($c$, $c$) key C, jaws B, and rail A, so that the weight of the cars will depress the base parts ($a$, $a$) of the chair, and thereby cause the jaw parts ($b$), to grip the rail A more firmly.

D. W. CROCKER.

Witnesses:
S. D. HULCE,
T. E. BELDING.

[FIRST PRINTED 1911.]